Aug. 17, 1943.  H. J. HORN  2,327,044
WHEEL
Filed Dec. 26, 1941
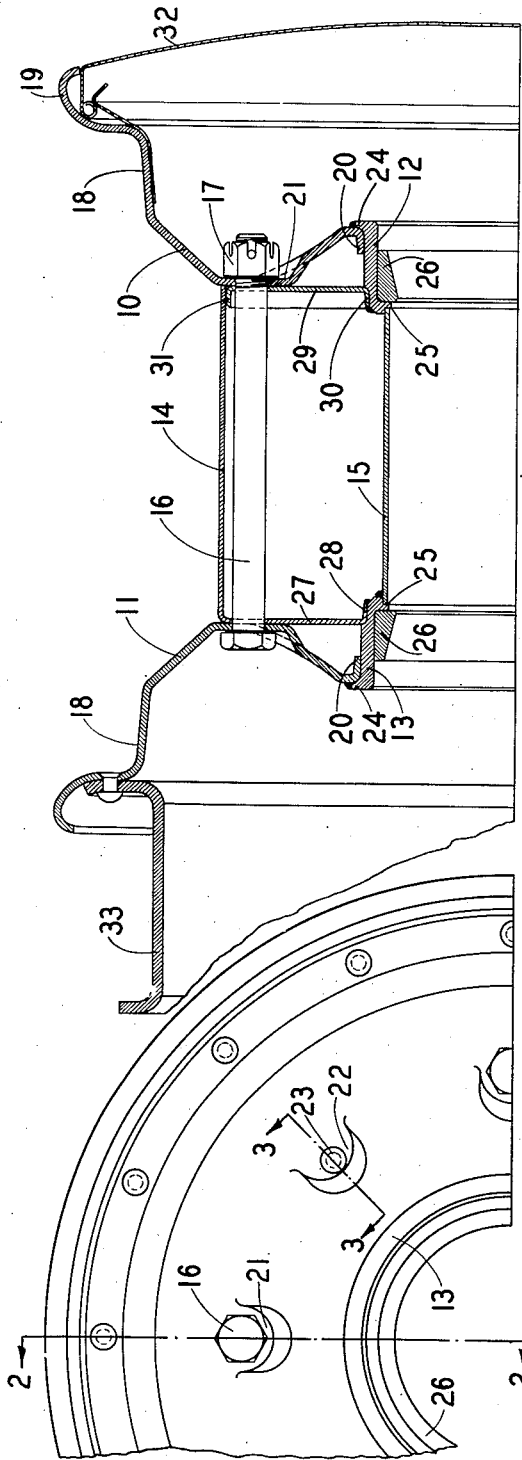
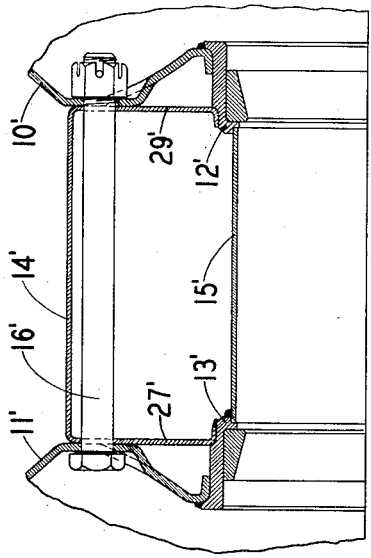
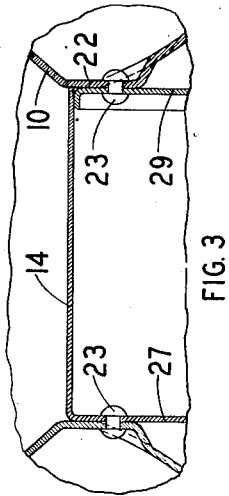
INVENTOR.
HARRY J. HORN
BY Carroll R. Taber
ATTORNEY.

Patented Aug. 17, 1943

2,327,044

UNITED STATES PATENT OFFICE 2,327,044

WHEEL

Harry J. Horn, Lansing, Mich., assignor to Motor Wheel Corporation, Lansing, Mich., a corporation of Michigan Application December 26, 1941, Serial No. 424,444

4 Claims. (Cl. 301—63)

This invention relates to pressed metal wheels, and particularly to such wheels of relatively great width in proportion to their diameter. The invention is especially applicable to airplane wheels.

The principal object of the invention is to provide a relatively light weight, rugged wheel composed of few parts which can be easily fabricated from sheet metal.

Another object is to provide a wheel which is easily assembled and disassembled to permit mounting and dismounting a pneumatic tire.

These objects and others ancillary thereto will more fully appear in the following specification when read in connection with the accompanying drawing, wherein—

Figure 1 is a fragmentary elevational view of a wheel embodying the invention;

Figure 2 is a fragmentary cross-sectional view taken on substantially the line 2—2 of Figure 1;

Figure 3 is a fragmentary cross-sectional view taken on substantially the line 3—3 of Figure 1;

Figure 4 is a fragmentary cross-sectional view of a modified form of the invention.

One form of the invention is embodied in a wheel shown in Figures 1 to 3. The wheel comprises generally a pair of side members 10 and 11, a pair of hub members 12 and 13 associated with the respective side members, two spacer members 14 and 15 for spacing the side and hub members apart, and a plurality of bolts 16 and nuts 17 for securing the parts of the wheel together. The wheel also includes a pair of reinforcement members 27 and 29. The wheel is completed by a removable cover 32 and a brake drum 33, the latter being riveted to the side member 11.

The two side members 10 and 11 are identical one piece annuli formed from pressed sheet metal. Each side member is formed to provide a tire bead seat 18 and a tire retaining flange 19 adjacent its outer perimeter. The flange 19 has a rolled edge. A large opening is formed in the center of each side member to receive the corresponding hub member 12 or 13. This opening is defined by an inturned cylindrical flange 20. Intermediate the seat 18 and the flange 20 the side members are provided with a plurality of circumferentially spaced openings for the reception of the bolts 16. The metal around each of these openings is deformed to provide flat, radially extending seats 21 for the heads of the bolts 16 and the nuts 17. Intermediate the seats 21 are additional flattened spots (see Figure 3) having openings therein for the reception of rivets 23. The axially inner surfaces of the seats 21 and 22 are all in the same plane.

The hub members 12 and 13 are identical annuli. The hub members may be made from pressed metal but preferably they are forgings. They are made to fit within the cylindrical flanges 20 and are provided at their axially outer ends with radial flanges 24 designed to abut against the outer surfaces of the respective side members 10 and 11. Annular rabbets 25 are formed at the axially inner ends of the hub members to receive the spacer 15. The hub members also are formed to receive the outer race 26 of an anti-friction bearing. The hub members 12 and 13 and their respective side members 10 and 11 are welded together.

The spacer 14 comprises a cylindrical radially outer portion and the radial reinforcement 27, formed integrally with one end thereof. A flange 28 is formed at the radially inner periphery of the reinforcement 27 which seats in a rabbet adjacent the inner end of the hub member 13 and is welded thereto. The reinforcement 27 is juxtaposed to the flat seats 21 and 22 on the side member 11 and is riveted to the latter by the rivets 23. The reinforcement 27 also is provided with openings registering with the bolt receiving openings in the side member 11.

Another radial reinforcement 29 is provided for the hub member 12 and side member 10. It is separate from the spacer member 14. The reinforcement 29 has axial flanges 30 and 31 at its inner and outer perimeters, respectively. Flange 30 seats in a rabbet in the hub member 12 and is welded to the hub member, while the flange 31 is removably telescoped within the spacer 14. The reinforcement 29 is riveted to side member 10 by rivets 23 (see Figure 3).

The spacer 15 is a cylinder. It fits within the rabbets provided therefor in the hub members 12 and 13 and may be welded to one or the other of the hub members, but not both.

The bolts 16 pass entirely through the wheel. The heads of the bolts 16 abut against the flat seats 21 in member 11 while the nuts 17 abut against the corresponding seats in the member 10. When the nuts 17 are threaded home against the side member 10 the parts of the wheel are clamped together. It will be noted that the bolts are located closely adjacent the spacer 14 whereby the force applied when the nuts are threaded home is principally a compressive force applied to the spacer 14, rather than a force causing undue flexing of the side members.

The wheel may be easily disassembled so that a tire can be mounted or dismounted by removing the nuts 17. When so disassembled, the wheel comes apart in two units, one including members 11, 13 and 14, while the other includes members 10, 12 and 29. If spacer 15 is welded to one of the hub members 12 or 13, it too becomes a part of one of the units.

The radially inner parts of side members 10 and 11, the hub members 12 and 13, and the respective reinforcements 27 and 29 form annular structures of triangular configuration. This construction stiffens the entire wheel and provides rigid supports for the hub members. Since the spacer 14 is rigidly attached to side member 11 by rivets, and telescopes over the flange 31 of reinforcement 29 which is rigid with the member 10, the parts are always accurately located radially with respect to each other.

Figure 4 of the drawing illustrates a slightly modified form of the invention. The wheel shown in Figure 4 is nearly identical to that shown in Figures 1 to 3, and the corresponding parts are indicated by the same reference characters primed. The sole difference between the two wheels is that both reinforcements 27' and 29' at the ends of the spacer 14' are integral with the latter. One of the reinforcements is riveted to the corresponding side member, preferably 27' to 11', and is welded to the adjacent hub member. The other reinforcement is held against the hub and side members only by the bolts 16'.

It will be evident from the foregoing that this invention provides a wheel which is simple in construction and made of relatively few parts. All of the parts can be formed from sheet metal, yet the completed wheel is stiff and rugged. The parts of the wheels can be, and preferably are, assembled permanently into two units which are readily separable to permit the mounting and dismounting of pneumatic tires.

In all of the different forms of the invention the radially inner spacer serves not only to stiffen the wheel axially and radially, but it can be used as a retainer for bearing lubricant.

The scope of the invention is indicated in the appended claims.

I claim:

1. A pressed metal wheel comprising a pair of axially spaced apart identical one piece annular side members formed to provide tire bead seats adjacent their outer perimeters and hub receiving openings at their inner perimeters, a hub member mounted in each of said openings, a single cylindrical spacer member concentric with said openings engaging said side members intermediate said tire bead seats and said openings for spacing said side members apart axially, said spacer member being provided at one end thereof with an integral radial reinforcement member engaging said hub member.

2. A pressed metal wheel of the character defined in claim 1 wherein said spacer member is provided with integral radial reinforcement members at both ends thereof engaging the respective hub members and permanently secured to one of said hub members.

3. A pressed metal wheel of the character defined in claim 1 wherein one of said side members is provided with a radial reinforcement member engaging said hub member, said reinforcement member being in telescopic relation with said spacer member at the end opposite the first mentioned reinforcement member.

4. A pressed metal wheel comprising a pair of axially spaced apart identical one piece annular side members formed to provide tire bead seats adjacent their outer perimeters and hub receiving openings at their inner perimeters, a hub member mounted in each of said openings, a single cylindrical spacer member concentric with said openings engaging said side members intermediate said tire bead seats and said openings for spacing said side members apart axially, and an annular reinforcing member at each end of the spacer member, each reinforcing member engaging the adjacent end of the spacer member and the adjacent hub member.

HARRY J. HORN.